Aug. 11, 1931.  C. RIGOTTI  1,818,357
PNEUMATIC SPRING
Filed Feb. 27, 1928   2 Sheets-Sheet 1
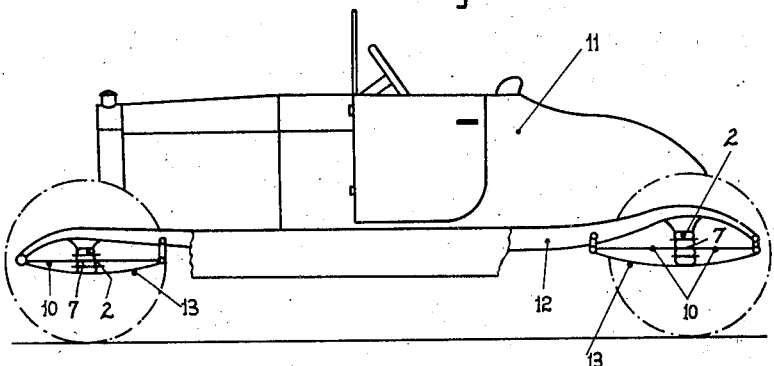
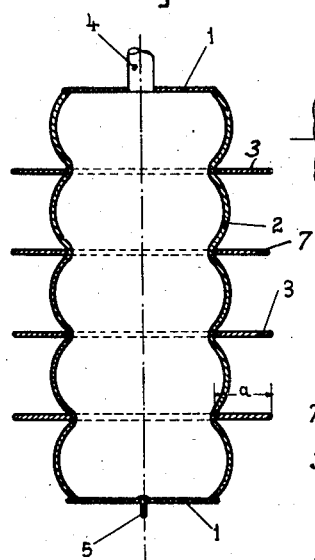
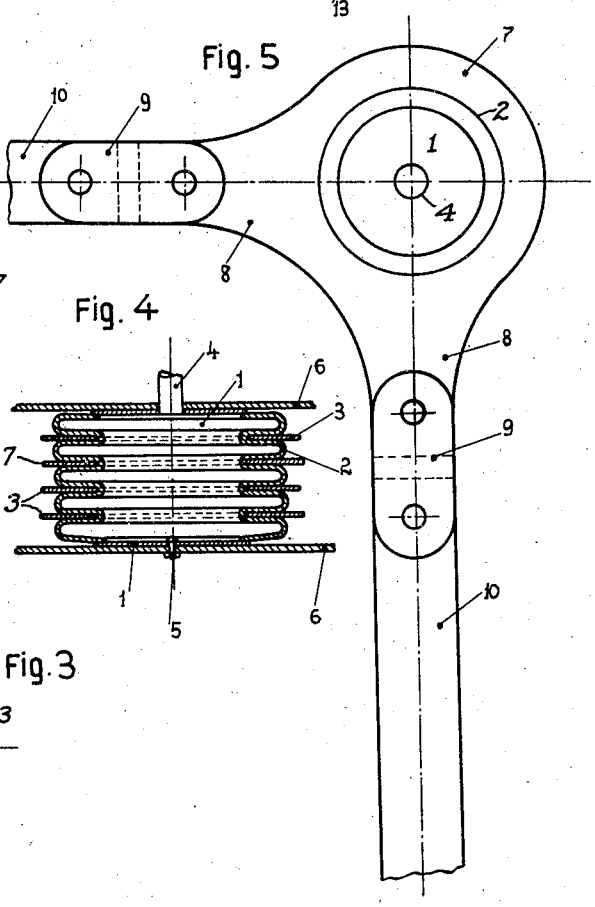
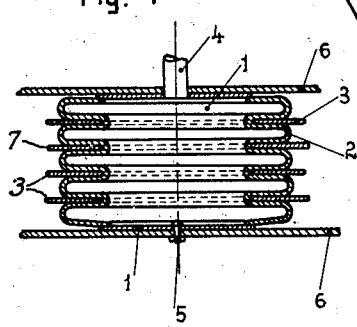
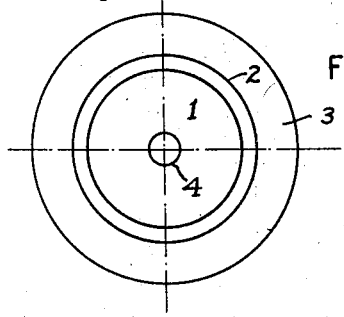
Inventor
Carlo Rigotti Aug. 11, 1931.  C. RIGOTTI  1,818,357
PNEUMATIC SPRING
Filed Feb. 27, 1928  2 Sheets-Sheet 2

Patented Aug. 11, 1931

1,818,357

UNITED STATES PATENT OFFICE

CARLO RIGOTTI, OF TURIN, ITALY

PNEUMATIC SPRING

Application filed February 27, 1928, Serial No. 257,507, and in Italy March 31, 1927.

The present invention relates to improvements in pneumatic springs particularly adapted for use in connection with motor cars and other vehicles in order to provide for comfortable springing and efficient shock absorbing.

It has been proposed to use pneumatic springs consisting of flexible containers filled either with compressed air or other suitable pressure fluid for the resilient suspension of motor vehicles; practically all the attempts made did not give any satisfactory results as it was impossible to minimize the rebounding effect of the pneumatic springs in question.

The object of this invention is to provide an improved form of flexible container, which is particularly suitable for the suspension of vehicles of the kind referred to, as it will minimize the rebounding effect hitherto experienced due to the deformation of the container being more or less suddenly stopped by the resistance as the contact surface of the container with the two parts between which it is placed rapidly increases.

It has been proposed to obviate this drawback by making the contact surfaces relatively small and almost unvariable during the elastic deformations. The above mentioned attempts have also proved unsatisfactory as owing to increased proportion adopted between the height and the diameter of the flexible body in order to obtain a sufficient springing, the resistance was excessively lessened in the horizontal plane of the suspension system. Therefore its use in connection with motor vehicles was impossible unless devices for guiding the vehicle frame in a vertical direction were adopted. This complicated the arrangement and the working was highly unsatisfactory.

According to this invention, the flexible container is subdivided into a plurality of sections by means of one or more comparatively rigid encircling rings. By this means the area of the contact surfaces is unaltered while a substantial amplitude of the resilient deformation is obtained, increasing also considerably the resistance in the horizontal direction of the flexible body.

When the proportion between the height and the diameter of the flexible body is very large I connect one of the intermediate encircling rings through one or more links to a fixed point of the frame. I thus stiffen the flexible body in the horizontal direction, without incurring the disadvantages of the rigid vertical frame guides.

The use of one or more metal rings depends upon the proportion between the height and the diameter of the flexible body. Successful results are obtained by placing the encircling metal rings at a distance from one another equal to (D—d), D being the external diameter and d the internal diameter of the metal encircling rings.

The accompanying drawings show by way of example, a constructional form of the device according to this invention.

Fig. 1 illustrates diagrammatically a motor vehicle fitted with the above apparatus.

Fig. 2 is an axial vertical section of the resilient body fully extended.

Fig. 3 is a plan view.

Fig. 4 is a view similar to Fig. 2, the resilient body being completely flattened and contracted.

Fig. 5 is a plan view with the top encircling ring omitted to show an intermediate encircling ring.

Figure 6:
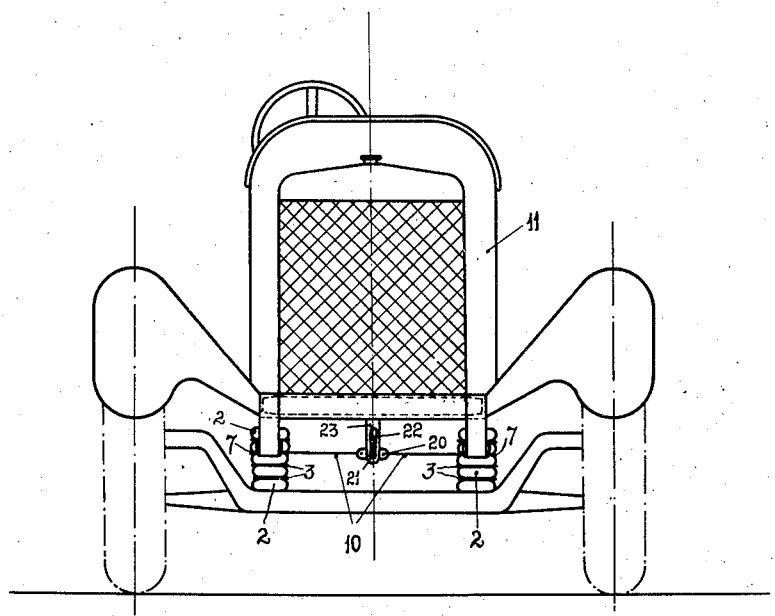
Fig. 6 is a diagrammatic front view of a motor vehicle equipped with pneumatic springs according to this invention.

In connection with Figs. 2 and 4 the flexible container comprises the end pieces 1 each consisting of a rigid metal disc, a cylindrical body 2 of flexible material and a plurality of comparatively rigid encircling rings 3, which subdivide the cylindrical body 2 into a plurality of equal sections.

4 is a pressure air inlet pipe and 5 denotes a screw for securing the flexible container to one of the members 6 in relative motion.

The radial width a of the thickness of the encircling rings is such that the resilient body 2 rests on the annular discs when the flexible member is fully contracted. This arrangement highly increases the resistance of the flexible container in the horizontal direction as a sufficient resistance is generated between the various sections and the encircling rings, which will avoid or at least keep within permissible limits the deformations in the horizontal direction.

The distance between the encircling rings 3 is preferably kept lower or at least equal to the width 2a. In case the proportion between the height of the extended body as shown in Fig. 2 and the diameter of the flexible container 2 is too large, I place an encircling ring 7, shown in detail in Fig. 5 at an intermediate point of the container 2. This ring is provided with ears 8 arranged at 90°, to which links 10 are connected by means of jointing plates 9; and articulated to suitable parts of the frame. It is thus possible to guide the flexible container during its resilient deformations in the vertical direction in a smoother manner than by the usual rigid guides used in several types of well known pneumatic suspensions.

The links 10 may be placed at 180° as shown in Fig. 1, but in particular circumstances the links could be placed at 90° as shown in Fig. 5.

Fig. 1 shows my pneumatic suspension in connection with a motor car of the usual type. 11 is the car body, 12 the frame member and 13 are suspension springs consisting of a simple plate. The flexible containers 2 are placed between this plate 13 and the frame member, and the central encircling ring 1 is provided with 2 links 10 at 180° articulated to the fastening points of the plate to the frame.

When the links 10 are placed at 90° apart as shown in Fig. 5 the links which are perpendicular to the longitudinal axis of the vehicle as shown in Fig. 6 are hinged on a member 20, provided with a pin 21 slidably mounted in a guide groove 22 formed in a bracket 23 which is centrally mounted on the vehicle frame. By said arrangement, during the spring movement the links 10 are always kept in alinement and therefore no transverse strains are generated in the pneumatic springs.

The constructive details may be varied at will from the example described and illustrated, according to the practical requirements and to the particular use of the device, without departing from the limits of this patent.

I can further employ a metallic spring opposing the pneumatic spring and adapted to check the rebounding of this latter. In connection with motor cars I use conveniently a single opposing spring on the front as well as on the rear couple of the suspension.

What I claim is:

1. A pneumatic spring for motor vehicles and the like, comprising a flexible tube filled with pressure air, and a plurality of annular plates spaced apart on said tube, the width of the plates being such that each tube portion when said tube is completely compressed, is fully supported between two adjacent annular plates.

2. A pneumatic spring for motor vehicles and the like, comprising a flexible tube filled with pressure air, a plurality of annular plates spaced apart on said tube, the width of the plates being such that each tube portion when said tube is completely compressed is fully supported between two adjacent annular plates, and links connecting one or more of said plates to the frame of the vehicle.

In testimony that I claim the foregoing as my invention, I have signed my name.

CARLO RIGOTTI.